United States Patent
Sonoda et al.

(10) Patent No.: US 8,842,217 B2
(45) Date of Patent: Sep. 23, 2014

(54) IMAGE PROCESSING APPARATUS AND IMAGE PROCESSING METHOD

(75) Inventors: Tetsuri Sonoda, Yokohama (JP); Mahoro Anabuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 12/994,945

(22) PCT Filed: Jul. 31, 2009

(86) PCT No.: PCT/JP2009/063977
§ 371 (c)(1),
(2), (4) Date: Nov. 29, 2010

(87) PCT Pub. No.: WO2010/016560
PCT Pub. Date: Feb. 11, 2010

(65) Prior Publication Data
US 2011/0085074 A1    Apr. 14, 2011

(30) Foreign Application Priority Data

Aug. 4, 2008 (JP) ................. 2008-201053

(51) Int. Cl.
| | | |
|---|---|---|
| H04N 5/238 | (2006.01) | |
| H04N 5/235 | (2006.01) | |
| H04N 5/232 | (2006.01) | |
| G06T 7/40 | (2006.01) | |
| G03B 7/095 | (2006.01) | |
| G06T 5/00 | (2006.01) | |

(52) U.S. Cl.
CPC .............. *G03B 7/095* (2013.01); *H04N 5/2353* (2013.01); *H04N 5/23248* (2013.01); *G06T 2207/30208* (2013.01); *G06T 7/402* (2013.01); *G06T 2207/10144* (2013.01); *G06T 5/003* (2013.01)
USPC .......................................... 348/363; 348/345

(58) Field of Classification Search
CPC ... H04N 5/238; H04N 5/2351; H04N 5/2352; H04N 5/2254; H04N 5/23209
USPC .......................................... 348/363
See application file for complete search history.

(56) References Cited

U.S. PATENT DOCUMENTS 5,719,986 A    2/1998 Kato et al.
5,960,217 A *  9/1999 Goto ............................... 396/65
(Continued)

FOREIGN PATENT DOCUMENTS

| JP | 7-209576 | 8/1995 |
| JP | 9-023423 A | 1/1997 |
| JP | 2003-219357 | 7/2003 |

OTHER PUBLICATIONS

International Search Report in International Application No. PCT/JP2009/063977, issued Nov. 11, 2009.

(Continued)

*Primary Examiner* — Twyler Haskins
*Assistant Examiner* — Fayez Bhuiyan
(74) *Attorney, Agent, or Firm* — Fitzpatrick, Cella, Harper & Scinto

(57) ABSTRACT

An image processing apparatus including an image acquisition unit configured to acquire, as an image, a result of imaging, on an image sensor unit, light traveling from an object via an opening of a stop, a control unit configured to control a shape of the opening based on a function which defines a temporal change of the shape of the opening when the image acquisition unit acquires the image, and a detection unit configured to detect a blur state in the image based on the function.

22 Claims, 16 Drawing Sheets

(56) References Cited

U.S. PATENT DOCUMENTS

| | | | |
|---|---|---|---|
| 6,212,336 B1* | 4/2001 | Tanaka et al. | 396/213 |
| 6,714,362 B2* | 3/2004 | Nomura et al. | 359/739 |
| 6,990,429 B2 | 1/2006 | Anabuki | |
| 7,551,355 B2* | 6/2009 | Iwasawa | 359/557 |
| 8,063,944 B2* | 11/2011 | Kido | 348/222.1 |
| 2002/0135895 A1* | 9/2002 | Nomura et al. | 359/819 |
| 2003/0052988 A1* | 3/2003 | Kurosawa | 348/360 |
| 2004/0201771 A1* | 10/2004 | Itoh | 348/363 |
| 2006/0152806 A1* | 7/2006 | Noguchi et al. | 359/557 |
| 2008/0002961 A1* | 1/2008 | Sundstrom | 396/133 |
| 2008/0112635 A1* | 5/2008 | Kondo et al. | 382/255 |

OTHER PUBLICATIONS

Veeraraghavan et al., "Dappled Photography: Mask Enhanced Cameras for Heterodyned Light Fields and Coded Aperture Refocusing," ACM Transactions on Graphics (Proc. SIGGRAPH) (2007).

Levin et al., "Image and Depth from a Conventional Camera with a Coded Aperture," ACM Transactions on Graphics (Proc. SIGGRAPH) (2007).

* cited by examiner

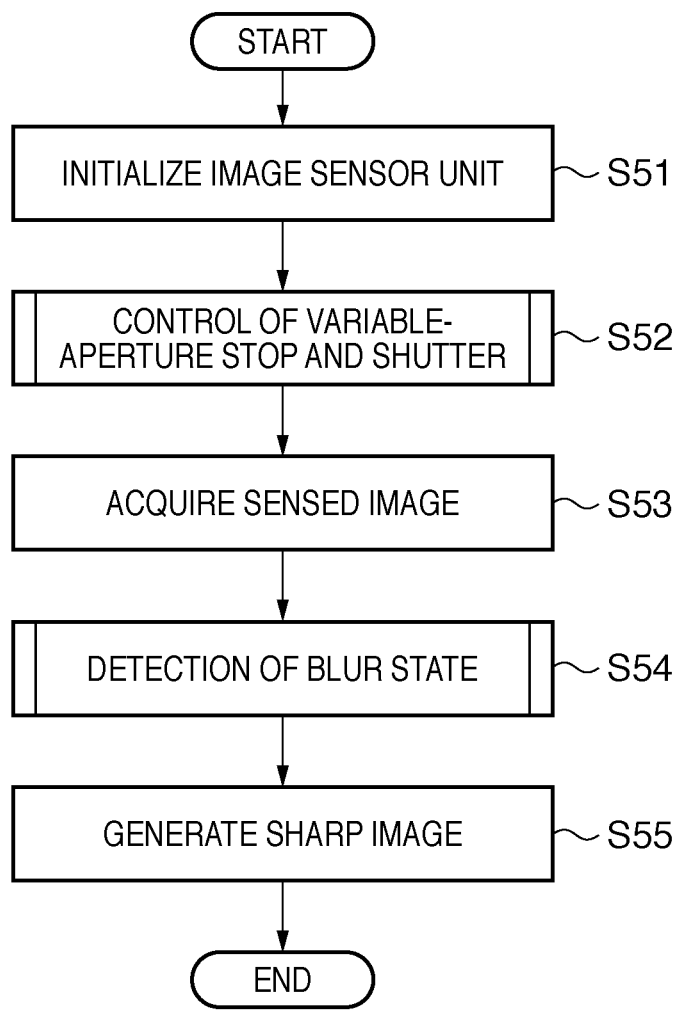

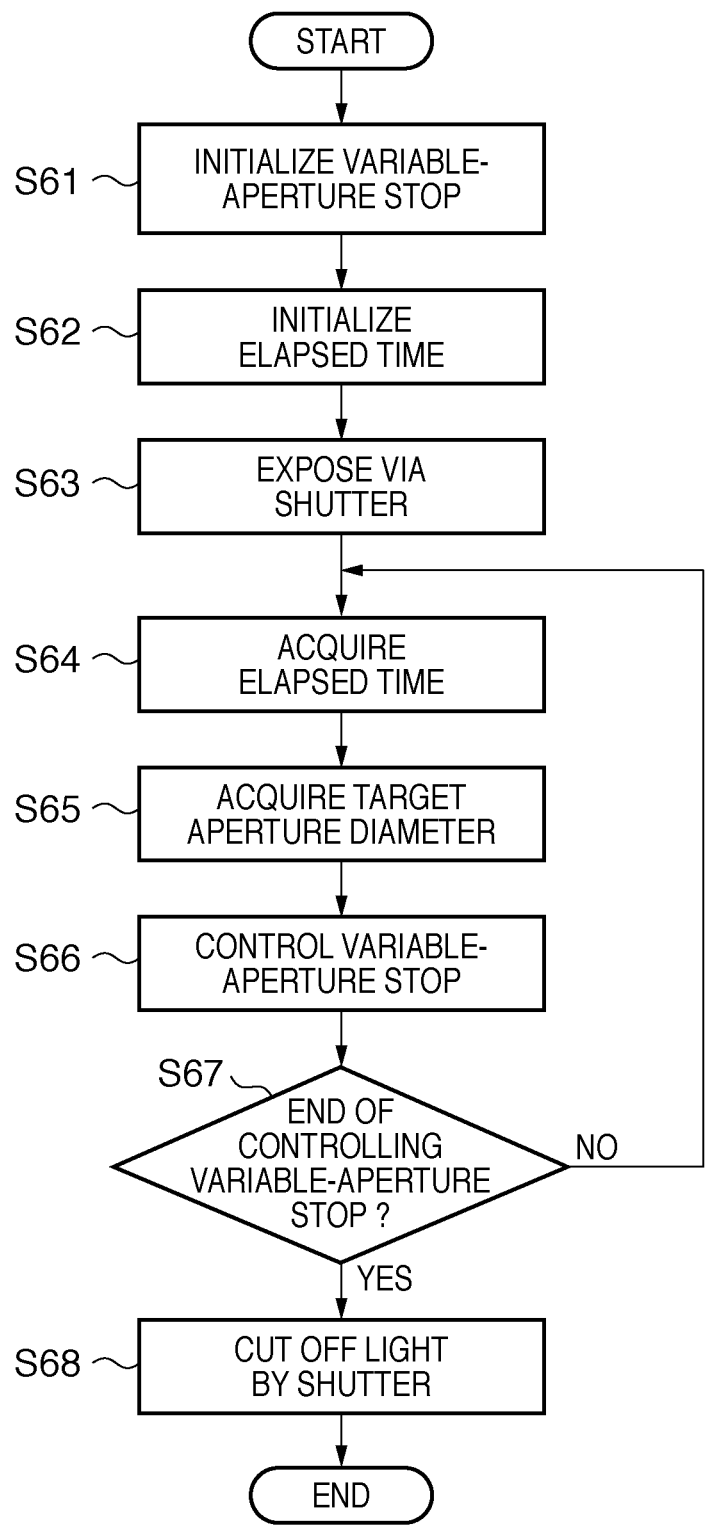

FIG. 12A
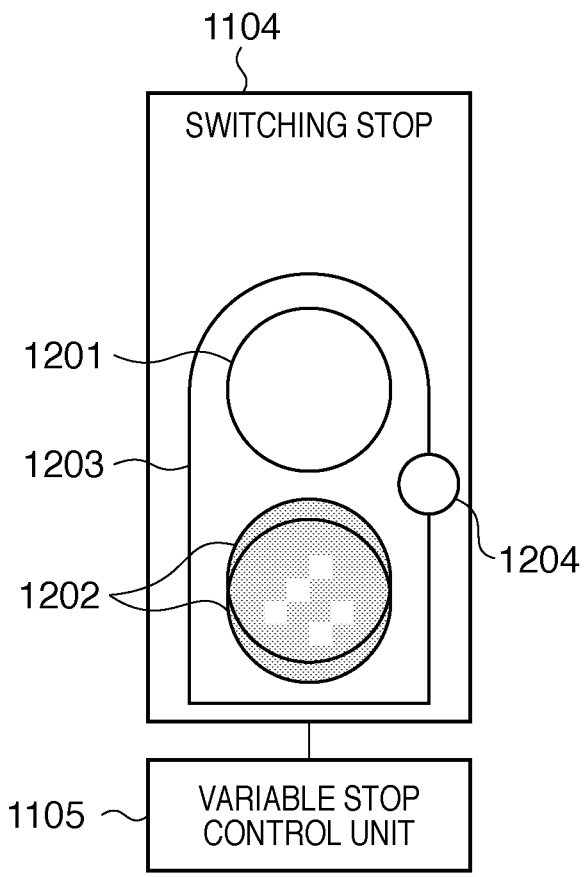
FIG. 12B       FIG. 12C
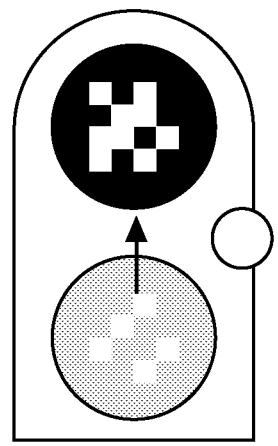   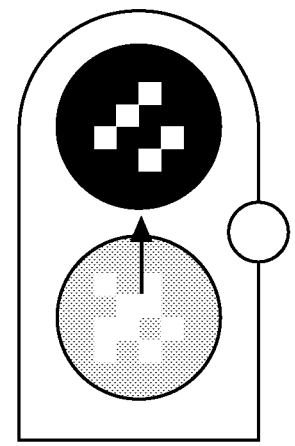

FIG. 17A
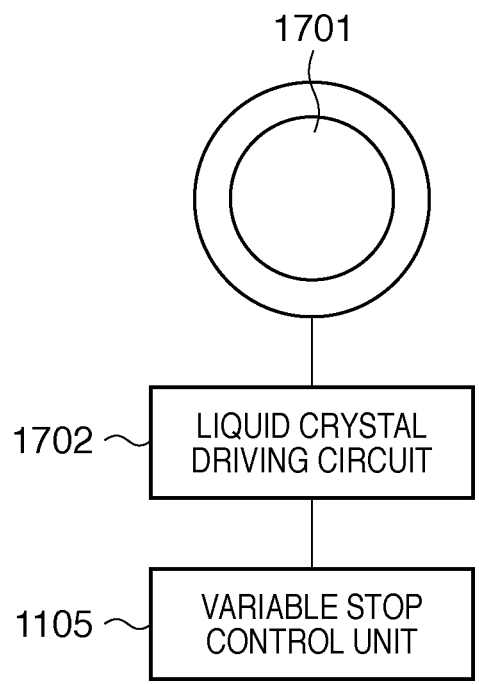
FIG. 17B  FIG. 17C
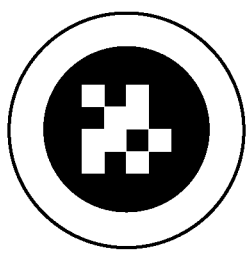 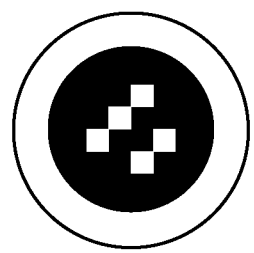

IMAGE PROCESSING APPARATUS AND IMAGE PROCESSING METHOD

TECHNICAL FIELD

The present invention relates to an image processing apparatus and image processing method and, more particularly, to a technique suited to detect a blur state from a sensed image.

BACKGROUND ART

It is known that when an object is imaged on the image sensing surface of an image sensor via an optical system including a zoom lens, the image sensed by the image sensor blurs under the influence of aberration of the optical system, unlike the original object, degrading the image quality.

It is known that when an object is imaged onto the image sensing surface of an image sensor via an optical system where its focal plane is placed on an offset position from a position of an object to be imaged, the image captured by the image sensor gets blurred. Thus, the image quality of the captured image is degraded.

A technique for preventing the degradation of image quality is deconvolution. This technique generates an unblurred clear sensed image by detecting a blur state from one sensed image containing a blur. Deconvolution, which is reverse to convolution, obtains an input function from an output function and weight function.

A coded aperture technique particularly enables deconvolution with different blur functions. For this purpose, the stop, which greatly affects the blur state, is set to a special shape, and an index for detecting a blur state is embedded in a sensed image.

According to a technique described in non-patent reference 1, a blur generated in an image sensed via a special fixed stop is embedded in a sensed image as the index for detecting a blur state. A blur function produced in the sensed image has a wide characteristic frequency distribution, and allows detecting a blur state which changes depending on the depth of each portion of an object.

According to a technique described in non-patent reference 2, a blur generated using a special stop is similarly embedded in a sensed image as the index for detecting a blur state. This technique intentionally reduces a specific frequency component in the blur function to detect a blur state which changes depending on the depth of each portion of an object.

[Non-patent Reference 1] Veeraraghavan, Raskar, R., Agrawal, A., Tumblin, J. (2007), "Dappled Photography: Mask Enhanced Cameras for Heterodyned Light Fields and Coded Aperture Refocusing", ACM Transactions on Graphics (Proc. SIGGRAPH)

[Non-patent Reference 2] Levin, A., Fergus, R., Durand, F., Freeman, B. (2007), "Image and Depth from a Conventional Camera with a Coded Aperture", ACM Transactions on Graphics (Proc. SIGGRAPH)

However, the techniques in non-patent references 1 and 2 employ a stop of a fixed shape. This limits a method for embedding the index in a sensed image to detect a blur state.

DISCLOSURE OF INVENTION

The present invention has been made to solve the above-described problems, and allows detecting a blur state from a sensed image at high precision by generating a characteristic blur pattern using a variable-aperture stop.

According to the first aspect of the present invention, an image processing apparatus comprises: an image acquisition unit configured to acquire, as an image, a result of imaging, on an image sensor unit, light traveling from an object via an opening of a stop; a control unit configured to control a shape of the opening based on a function which defines a temporal change of the shape of the opening when the image acquisition unit acquires the image; and a detection unit configured to detect a blur state in the image based on the function.

According to the second aspect of the present invention, an image processing method, by using a computer to perform the steps of: an acquisition step of acquiring, as an image, a result of imaging, on an image sensor unit, light traveling from an object via an opening of a stop; a control step of controlling a shape of the opening based on a function which defines a temporal change of the shape of the opening when acquiring the image; and a detection step of detecting a blur state in the image based on the function.

Further features of the present invention will become apparent from the following description of exemplary embodiments with reference to the attached drawings.

BRIEF DESCRIPTION OF DRAWINGS

FIG. 5 is a flowchart for explaining the procedure of image sensing processing according to the first embodiment;

FIG. 6 is a flowchart for explaining the control procedure of the variable-aperture stop and shutter according to the first embodiment;

FIGS. 12A to 12C are views exemplifying the schematic structure of a switching stop according to the second embodiment;

FIGS. 17A to 17C are views exemplifying a liquid crystal stop having an aperture shape defined by liquid crystal according to the second embodiment.

BEST MODE FOR CARRYING OUT THE INVENTION

Embodiments of the present invention will be described in detail below with reference to the accompanying drawings. These embodiments are merely examples of a configuration of the present invention set forth in the following claims, and the present invention should not be limited to these embodiments.

First Embodiment

Figure 1:
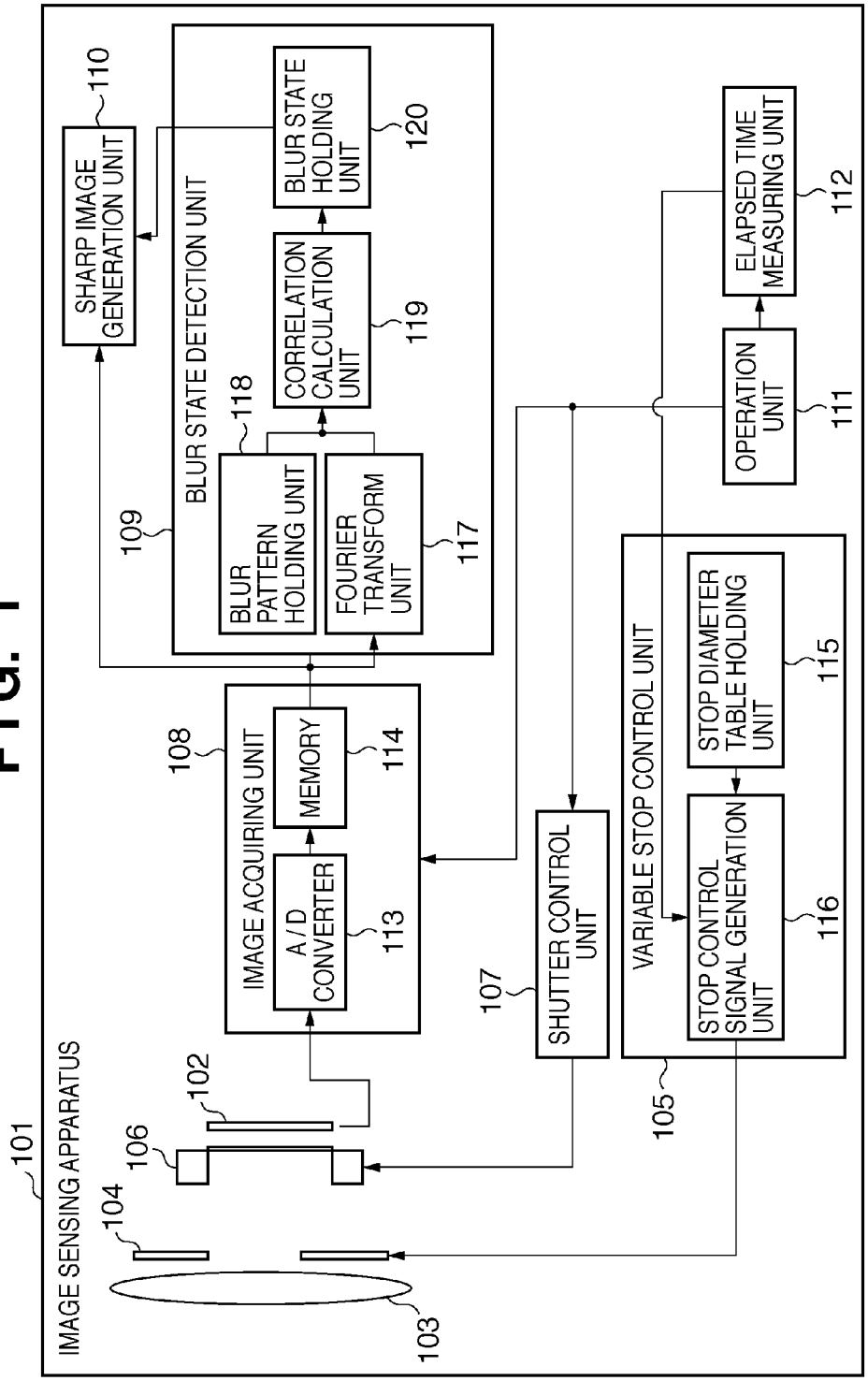
FIG. 1 is a block diagram exemplifying the arrangement of an image sensing apparatus according to the first embodiment.

FIG. 1 exemplifies the arrangement of an image sensing apparatus 101 according to the first embodiment to which the present invention is applied. As shown in FIG. 1, the image sensing apparatus 101 in the first embodiment includes an image sensor unit 102, an imaging lens 103, a variable-aperture stop 104 serving as a variable stop, and a variable stop control unit 105. The image sensing apparatus 101 also includes a shutter 106, shutter control unit 107, image acquiring unit (sensed image generation unit) 108, blur state detection unit 109, sharp image generation unit 110, operation unit 111, and elapsed time measuring unit 112.

The image sensor unit 102 detects light entering its surface by using elements arrayed two-dimensionally along the x- and y-axes. Examples of the image sensor unit 102 are a CCD image sensor and a CMOS image sensor. In the arrangement according to the first embodiment, the image sensor unit 102 has a flat rectangular shape, and detects light of an object image projected via the imaging lens 103 and variable-aperture stop 104. A color image can be acquired by disposing a low-pass filter, a color filter of a Bayer array, or the like in front of the element array.

The imaging lens 103 includes an optical system for projecting an object image on the image sensor unit 102. The imaging lens 103 in the first embodiment uses a single convex lens. The variable-aperture stop 104 (to be described later) is arranged at the aperture position to change the aperture diameter. The imaging lens 103 need not always use a single convex lens, and may be made up of a plurality of lenses or a combination with a reflecting mirror as long as an object image can be projected on the image sensor unit 102 and the variable-aperture stop 104 can be arranged.

The shutter 106 exposes or shields the image sensor unit 102 to or from light by transmitting or cutting off light traveling from an object in cooperation with the variable-aperture stop 104. In the first embodiment, the shutter 106 switches at an arbitrary timing to expose or shield the image sensor unit 102 to or from light of a projected object image obtained by the imaging lens 103. The shutter 106 is, e.g., a mechanical focal plane shutter. The shutter control unit 107 controls the exposure/shielding timing of the shutter 106.

The image acquiring unit 108 includes an A/D converter 113 and memory 114. The image acquiring unit 108 converts light of a projected object image sensed by the image sensor unit 102 into digital data to generate a sensed image a(x,y) having a 2D luminance distribution and store it in the memory 114.

Figure 2A:
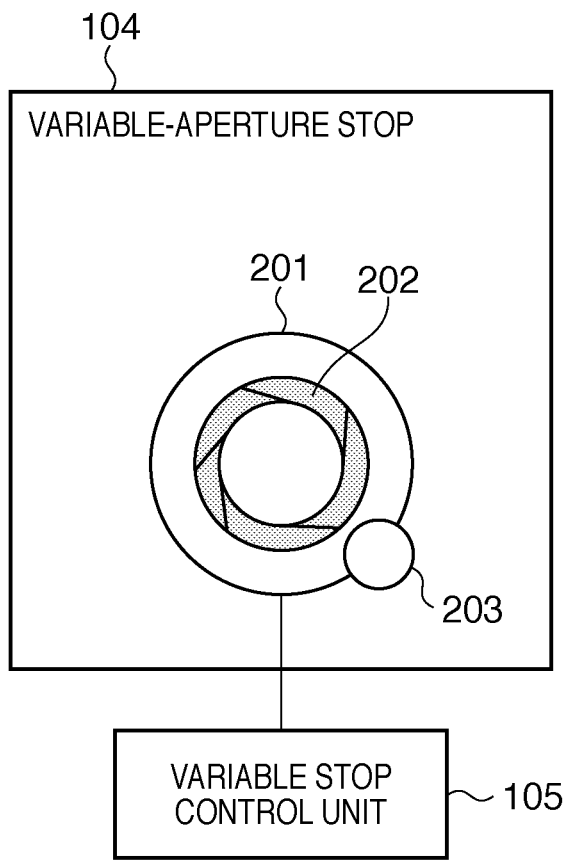
FIGS. 2A and 2B are views exemplifying the structure of a variable-aperture stop according to the first embodiment.
Figure 2B:
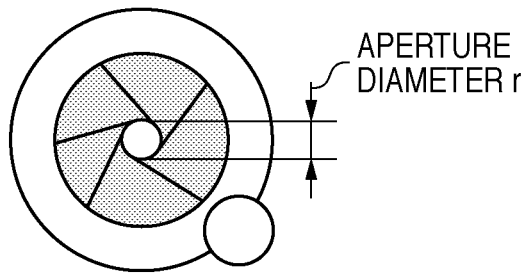

The variable-aperture stop 104 changes the aperture diameter of the imaging lens 103. FIGS. 2A and 2B show the schematic structure of the variable-aperture stop 104 in the first embodiment. As shown in FIG. 2A, the variable-aperture stop 104 includes an outer frame 201, aperture blades 202 which rotate with respect to the outer frame 201 to change an aperture diameter r, as shown in FIG. 2B, and a motor 203 which drives the aperture blades 202. The variable-aperture stop 104 can arbitrarily change the aperture diameter r of the imaging lens 103 under the control of the variable stop control unit 105.

The variable stop control unit 105 includes a stop diameter table holding unit 115 and stop control signal generation unit 116. The stop diameter table holding unit 115 holds a table made up of a time t elapsed from an image sensing operation, and the target value of the aperture diameter r of the variable-aperture stop 104 that changes over the elapsed time t.

Figure 3:
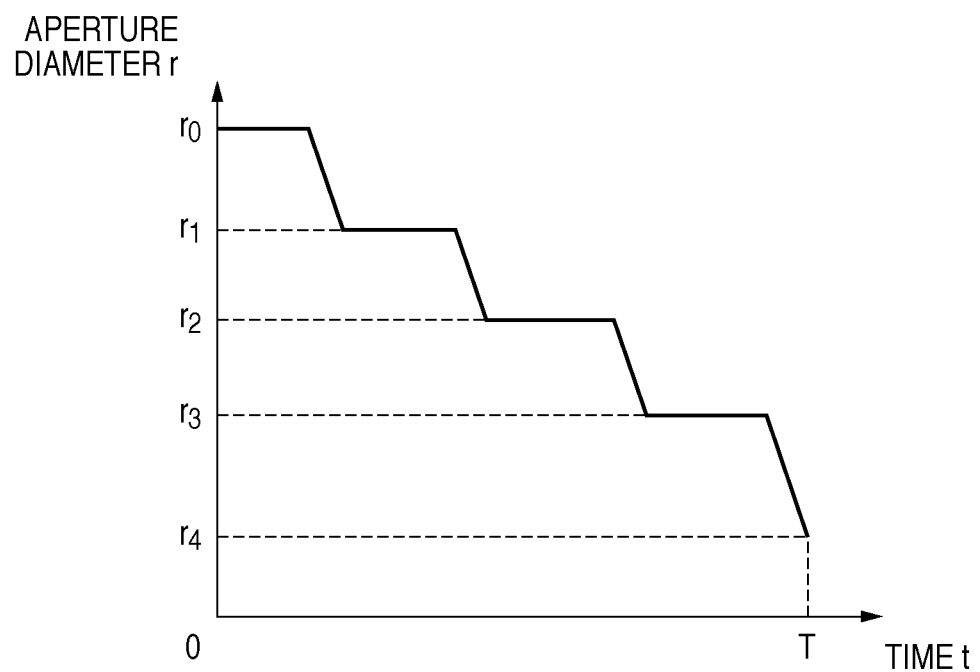
FIG. 3 is a graph showing the characteristic between the elapsed time and the aperture diameter that is held in a stop diameter table holding unit according to the first embodiment.
Figure 4A:
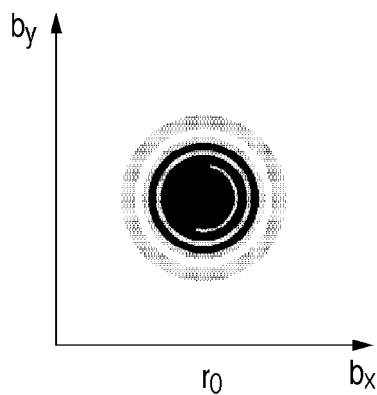
FIGS. 4A to 4E are graphs showing characteristics for aperture diameters $r_0$ to $r_4$ between the luminance and a position ($b_x$, $b_y$) from the center of a blur in a blurred image of an object which is a point source present at a predetermined distance from an imaging lens according to the first embodiment.
Figure 4B:
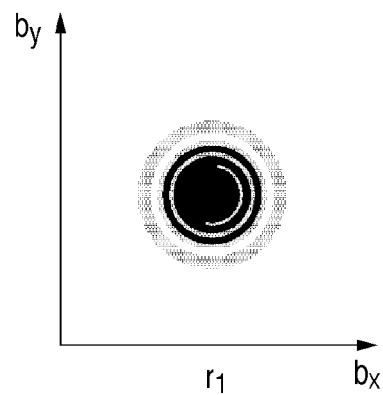
Figure 4C:
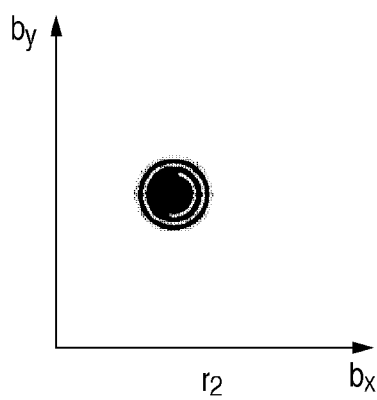
Figure 4D:
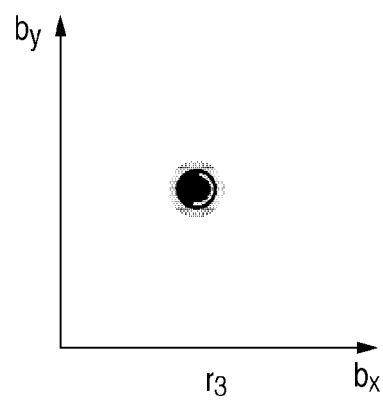
Figure 4E:
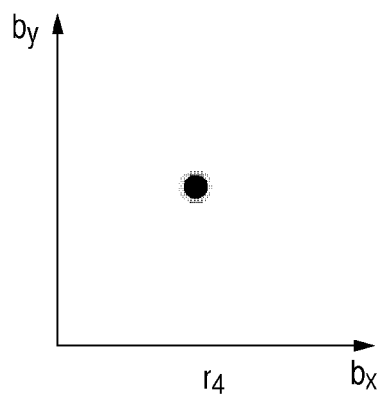

FIG. 3 shows the characteristic between the elapsed time t and the aperture diameter r that is held in the stop diameter table holding unit 115. The characteristic shown in FIG. 3 may be prepared as a lookup table. In FIG. 3, an aperture diameter $r_0$ corresponds to the first shape, and an aperture diameter $r_4$ corresponds to the second shape. The relationship between the elapsed time t and the aperture diameter r in FIG. 3 can be given by $$r = g(t) \quad (1)$$

Instead of the aperture diameter r in this function, the aperture area, peripheral aperture length, and the like is also available. The function may be defined by the change amount (speed) of the aperture diameter, aperture area, peripheral aperture length, or the like.

FIGS. 4A to 4E show characteristics for the aperture diameters $r_0$ to $r_4$ between the luminance and a position ($b_x$, $b_y$) from the center of a blur in a blurred image of an object which is a point source present at a predetermined distance from the imaging lens 103. In each blurred image, a dark portion exhibits a high-luminance region. This characteristic changes depending on the aperture diameter r of the variable-aperture stop 104, as represented by the aperture diameters $r_0$ to $r_4$. The characteristic further changes depending on a distance z between the imaging lens 103 and the point source. A luminance i at the position ($b_x$, $b_y$) from the center of a blur upon statically sensing an image at an arbitrary aperture diameter r and distance z from the point source can be written as $$i = f(b_x, b_y, z, r) \quad (2)$$

Equation (2) assumes that light emitted by the point source has a uniform $f(b_x, b_y, z, r)$ regardless of the position and angle at which the light passes through the imaging lens 103. A projected object image sensed by the image sensor unit 102 is considered to be obtained by convoluting as many point sources as the pixels of the image sensor unit 102 in the sensed image a(x,y) in accordance with equation (2). Based on equation (2), a luminance j at the distance z from the point source and the position ($b_x$, $b_y$) from the center of a blur in a blurred point source image generated after exposure can be given by $$j(b_x, b_y, z) = \int_{r_0}^{r_4} f(b_x, b_y, z, r) dr \quad (3)$$

Equation (1) yields $$j(b_x, b_y, z) = \int_{r_0}^{r_4} f(b_x, b_y, z, g(t)) dr \quad (4)$$

$$j(b_x, b_y, z) = \int_{r_0}^{r_4} f(b_x, b_y, z, g(t)) \frac{dr}{dt} dt$$

$$j(b_x, b_y, z) = \int_0^T f(b_x, b_y, z, g(t)) g'(t) dt$$

$J(\omega_x, \omega_y, z)$ represents a 2D Fourier transform along the spatial axes $b_x$ and $b_y$ when the distance z between the imaging lens 103 and the point source takes a predetermined value at $j(b_x, b_y, z)$. Letting $H(\omega_x, \omega_y)$ be a spatial frequency distribution, i.e., 2D Fourier transform in a general projected object image h(x, y), a correlation function Ka of $J(\omega_x, \omega_y, z)$ is $$Ka(z) = \int_{\omega_{ymin}}^{\omega_{ymax}} \int_{\omega_{xmin}}^{\omega_{xmax}} \|J(\omega_x, \omega_y, z) H(\omega_x, \omega_y,)\|^2 d\omega_x d\omega_y \quad (5)$$

At this time, assume that $(b_x, b_y)$ and (x, y) are on the same spatial axes, the x-axis frequency component $\omega_x$ takes a value ranging from $\omega_{min}$ to $\omega_{max}$, and the y-axis frequency component $\omega_y$ takes a value ranging from $\omega_{ymin}$ to $\omega_{ymax}$. An autocorrelation function Km upon a change of the distance z between the imaging lens 103 and the point source by $\Delta z$ is $$Km(z) = \int_{\omega_{ymin}}^{\omega_{ymax}} \int_{\omega_{xmin}}^{\omega_{xmax}} \|J(\omega_x, \omega_y, z) J(\omega_x, \omega_y, z + \Delta z)\|^2 d\omega_x d\omega_y \quad (6)$$

g(t) is determined to set Ka not to 0 but close to 0 within the possible range of the distance z between the imaging lens 103 and the point source. This is equivalent to an operation capable of easily separating a sharp projected object image from a blurred image physically in the frequency domain. At the same time, g(t) is defined to make Km close to 0 with a small $\Delta z$. This is equivalent to an operation of increasing the resolving power for detecting a change of the distance z between the imaging lens 103 and the point source from a change of a blurred image.

Note that g(t) need not always be calculated analytically and uniquely. According to the embodiment, Ka and Km are calculated by repetitively generating g(t) controllable by the variable-aperture stop 104 at random. g(t) which produces Ka and Km closest to 0 is selected from the repetitively generated g(t).

For example, when the aperture diameter r is defined by g(t) which changes from the r0 to r4 positions with a nondifferentiable value at one or more points, as shown in FIG. 3, the Ka and Km values can come closer to 0. In practice, however, control for a completely nondifferentiable value is difficult, and g'(t) in equation (4) cannot be derived. Hence, drastic control for an almost nondifferentiable value is required to be performed.

In this way, g(t) to be held in the stop diameter table holding unit 115 is determined, and the aperture diameter r of the variable-aperture stop 104 is controlled based on g(t). The index for detecting a blur state can therefore be embedded in the sensed image $\underline{a}$.

The stop control signal generation unit 116 supplies a control signal to the variable-aperture stop 104 to attain the aperture diameter r based on the elapsed time t obtained from the elapsed time measuring unit 112 and the target aperture diameter r obtained from the stop diameter table holding unit 115.

The blur state detection unit 109 includes a Fourier transform unit 117, blur pattern holding unit 118, correlation calculation unit 119, and blur state holding unit 120. The blur pattern holding unit 118 holds a pattern $Jp(\omega_x, \omega_y, z)$ representing the Fourier transform of the blur function j(x, y, z) upon sensing a point source at the distance z from the imaging lens 103. As the value range of the pattern, the x-axis frequency component $\omega_x$ ranges from $\omega_{xmin}$ to $\omega_{xmax}$, and the y-axis frequency component $\omega_y$ ranges from $\omega_{ymin}$ to $\omega_{ymax}$ as a result of performing discrete sampling at all the possible distances z between the object and the imaging lens 103.

The Fourier transform unit 117 sets a pixel position (x, y) to detect a blur state in the sensed image $\underline{a}$ stored in the memory 114 of the image acquiring unit 108. Then, the Fourier transform unit 117 extracts a unit rectangular region u having a predetermined size centered at the pixel position (x, y). The size of the rectangular region to be extracted needs to satisfy at least the conditions that the x-axis frequency component $\omega_x$ takes a value within the range of $\omega_{xmin}$ to $\omega_{xmax}$ and the y-axis frequency component $\omega_y$ takes a value within the range of $\omega_{ymin}$ to $\omega_{ymax}$. A 2D Fourier transform $U(\omega_x, \omega_y)$ is generated for the extracted unit rectangular region u.

The correlation calculation unit 119 calculates a correlation function Kr between the blur pattern $Jp(\omega_x, \omega_y, z)$ and the Fourier transform $U(\omega_x, \omega_y)$ of the unit rectangular region u extracted from the sensed image $\underline{a}$:

$$Kr(z) = \int_{\omega_{ymin}}^{\omega_{ymax}} \int_{\omega_{xmin}}^{\omega_{xmax}} \|Jp(\omega_x, \omega_y, z) U(\omega_x, \omega_y,)\|^2 d\omega_x d\omega_y \quad (7)$$

Based on equation (7), Kr is calculated for all the possible distances z between the object and the imaging lens 103. A distance $z_p(x, y)$ at which Kr maximizes serves as a distance to an object at the pixel position (x, y) in the sensed image $\underline{a}$, and $Jp(\omega_x, \omega_y, z)$ represents the Fourier transform of a blurred image at the pixel position (x, y).

The blur state holding unit 120 holds, as blur states, Fourier transforms $Jp(\omega_x, \omega_y, z)$ and distances $z_p(x, y)$ at which Kr maximizes in all the pixels of the sensed image $\underline{a}$, which are calculated by the correlation calculation unit 119.

The sharp image generation unit 110 generates a blur-free sharp image $a_s$ from the sensed image $\underline{a}$ and the blur states held in the blur state holding unit 120. A concrete procedure of this processing will be explained.

$A(\omega_x, \omega_y)$ represents the Fourier transform of the sensed image a(x, y). When the distance z between the object and the imaging lens 103 is constant, a Fourier transform $Ad(\omega_x, \omega_y, z)$ after deconvolution based on the blur pattern $Jp(\omega_x, \omega_y, z)$ is given by $$Ad(\omega_x, \omega_y, z) = A(\omega_x, \omega_y) \cdot \frac{1}{Jp(\omega_x, \omega_y, z)} \quad (8)$$

for $\|Jp(\omega_x, \omega_y, z)\|^2 = 0$.

$(\omega_x, \omega_y, z)$ is not calculated according to equation (8), and is interpolated from the calculated value of an adjacent $Ad(\omega_x, \omega_y, z)$. $Ad(\omega_x, \omega_y, z)$ is calculated for all the possible distances z between the object and the imaging lens 103. Each Ad undergoes an inverse Fourier transform, obtaining a deconvolution image $a_d(x, y, z)$. The sharp image $a_s(x, y)$ is calculated based on the distance $z_p(x, y)$ at each pixel:

$$a_s(x,y)=a_d(x,y,z_p(x,y)) \quad (9)$$

By this processing, the sharp image generation unit 110 can generate the sharp image $a_s(x, y)$.

The, operation unit 111 includes a button to be pressed to input an image sensing operation from the user. The operation unit 111 is not particularly limited to the button and may include a combination of a touch panel and GUI in accordance with the form of the image sensing apparatus as long as an image sensing operation can be input.

The elapsed time measuring unit 112 measures a time elapsed from the user image sensing operation input from the operation unit 111.

FIG. 5 is a flowchart for explaining the procedure of image sensing processing.

The image sensing processing starts when the user presses the button of the operation unit 111 to give an image sensing operation to the image sensing apparatus.

In step S51, the image acquiring unit 108 reads out and initializes all light detection states left in the image sensor unit 102 in FIG. 1.

In step S52, the variable stop control unit 105 initializes the variable-aperture stop 104 to the aperture diameter $r_0$ at the start of exposure. Upon completion of initializing the image sensor unit 102 and variable-aperture stop 104, the variable-aperture stop 104 and shutter 106 are controlled to perform exposure. The control procedure of the variable-aperture stop 104 and shutter 106 in exposure will be described later.

After the exposure, the process advances to step S53 to acquire a sensed image. More specifically, the A/D converter 113 in the image acquiring unit 108 reads light of a projected object image sensed by the image sensor unit 102 and converts it into digital data. The memory 114 stores the digital data as a sensed image a.

The process advances to step S54. The blur state detection unit 109 reads out the sensed image a from the memory 114 to detect a blur state in the sensed image a. The procedure to detect a blur state by the blur state detection unit 109 will be explained later.

Finally in step S55, the sharp image generation unit 110 reads out the sensed image a from the memory 114 in the image acquiring unit 108. The sharp image generation unit 110 also reads out the blur states from the blur state holding unit 120 in the blur state detection unit 109. Then, the sharp image generation unit 110 generates an unblurred sharp image $a_s$.

The control procedure of the variable-aperture stop 104 and shutter 106 will be described.

FIG. 6 is a flowchart for explaining the control procedure of the variable-aperture stop 104 and shutter 106.

In step S61, the variable stop control unit 105 controls the variable-aperture stop 104 to be located at the initial position $r_0$ in exposure. The process advances to step S62 to initialize the elapsed time measuring unit 112 to set the time t elapsed from an image sensing operation=0, and start measuring an elapsed time.

The process advances to step S63 to control the shutter 106 to an exposure state. In step S64, the elapsed time t is acquired from the elapsed time measuring unit 112. Based on the elapsed time t serving as an input, the target aperture diameter r of the variable-aperture stop 104 is acquired from the stop diameter table holding unit 115 (step S65).

Thereafter, the process advances to step S66. The stop control signal generation unit 116 supplies a signal to the variable-aperture stop 104 to change it to the target aperture diameter r acquired in step S65. It is determined in step S67 whether the control of the variable-aperture stop 104 has ended through the cycle of acquiring the elapsed time t, acquiring the target aperture diameter r, and supplying a signal to the variable-aperture stop 104. If it determined that the control of the variable-aperture stop 104 has not ended, the process returns to step S64 to repeat the cycle until the variable-aperture stop 104 has reached the aperture diameter $r_4$ at the time T in FIG. 3.

If the variable-aperture stop 104 has reached the aperture diameter $r_4$, the cycle ends to cut off light by the shutter 106 (step S68). After that, the process ends. This processing is executed to control the variable-aperture stop 104 and shutter 106.

Figure 7:
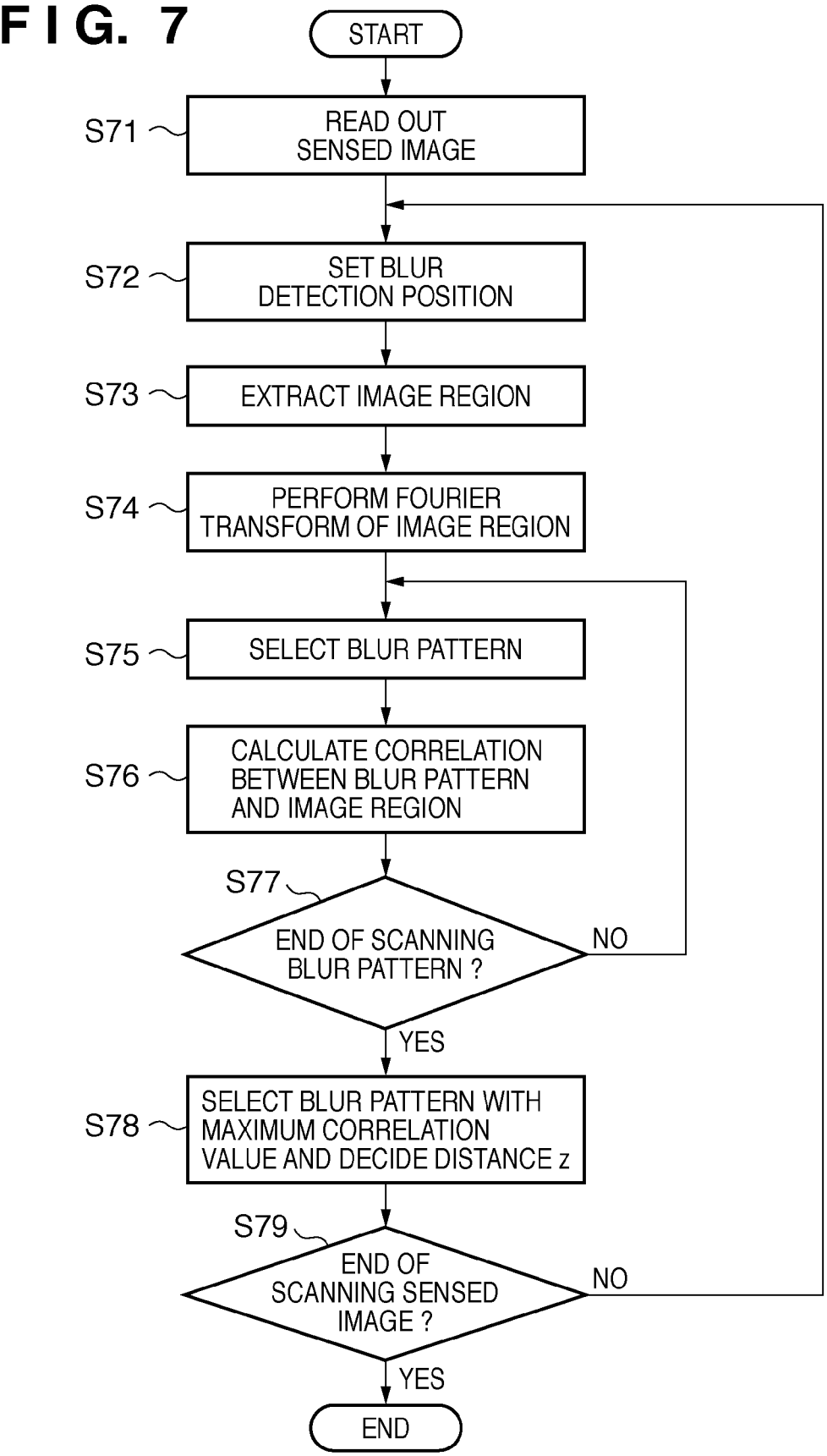
FIG. 7 is a flowchart for explaining a blur state detection procedure by a blur state detection unit according to the first embodiment.
Figure 8A:
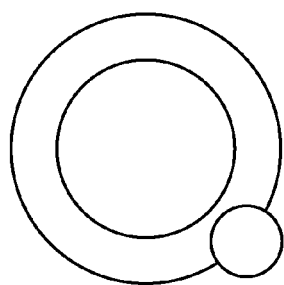
FIGS. 8A to 8D are views exemplifying a variable-aperture stop having an opening of a special shape according to the first embodiment.
Figure 8B:
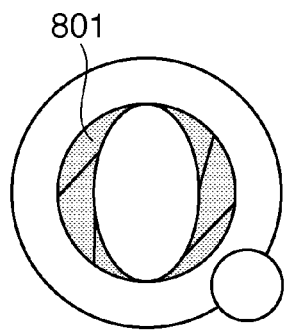
Figure 8C:
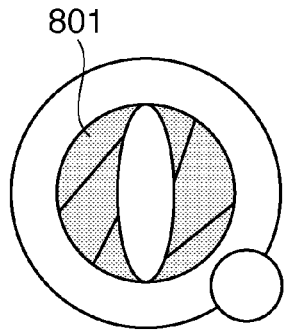
Figure 8D:
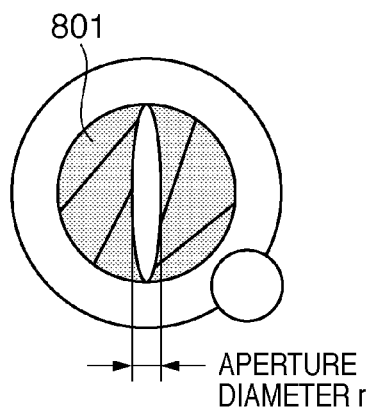

The above-mentioned blur state detection procedure will be explained. FIG. 7 is a flowchart for explaining the blur state detection procedure by the blur state detection unit 109.

In step S71, the Fourier transform unit 117 in the blur state detection unit 109 reads out the sensed image a stored in the memory 114 of the image acquiring unit 108.

The process advances to step S72 to set a pixel position (x, y) to detect a blur state in the sensed image a read out in step S71 (step S72). The unit rectangular region u centered on the pixel position (x, y) is extracted from the sensed image a (step S73), and the Fourier transform U of the unit rectangular region u is calculated (step S74).

The process then advances to step S75. The correlation calculation unit 119 sets the distance z between the object and the imaging lens 103, and selects a blur pattern Jp corresponding to the distance z from the blur pattern holding unit 118.

In step S76, the correlation function Kr between the Fourier transform U and Jp is calculated based on equation (7). Since the correlation function Kr is calculated for all the possible distances z, Jp is selected repetitively and Kr is calculated for each Jp.

In step S77, it is determined whether scanning of all blur patterns has ended. If it is determined that the scanning has not ended, the process returns to step S75 to repeat the above-described processing. If it is determined in step S77 that the scanning has ended, the process advances to step S78 to set a distance z at which the correlation function Kr maximizes as a distance $z_p(x, y)$ from the object at the pixel position (x, y). The distance $z_p(x, y)$ is recorded in the blur state holding unit 120 together with the blur pattern Jp.

In step S79, it is determined whether scanning has ended at all the pixel positions (x, y) of the sensed image a. If it is determined that the scanning has not ended, the process returns to step S72 to repeat the above-described processing. If it is determined in step S79 that the scanning has ended at all the pixel positions (x, y), the process ends.

The first embodiment executes the above-described processing to embed the index in a sensed image to detect a blur state, and detect an embedded blur state. The number of index patterns for embedding a blur state can be freely increased by changing g(t) in the variable stop control unit 105. Hence, the number of index patterns for embedding a blur state is not limited, unlike a conventional technique using a fixed stop to embed the index for detecting a blur state.

The conventional technique employs a fixed stop of a special shape, and it is difficult to apply this stop to a camera used for normal shooting. By contrast, the first embodiment adopts the variable-aperture stop 104 having the same shape as that for a camera used for normal shooting. The embodiment enables both shooting for embedding a blur state and normal shooting.

Note that the opening of the variable-aperture stop 104 in FIG. 2A has an almost circular shape similarly to a camera used for normal shooting. To acquire a blur state more accurately, the opening desirably has a special shape.

FIGS. 8A to 8D exemplify a variable-aperture stop having an opening of a special shape. Aperture blades 801 of the variable-aperture stop in FIGS. 8A to 8D are configured so that the opening forms a vertically elongated shape like a cat's eye as it is narrowed down. The variable-aperture stop having an opening of this shape can more accurately acquire a blur state from an object whose y-axis frequency component $\omega_y$ changes greatly.

In the variable stop control unit 105, the change speed of the aperture diameter r need not always be nondifferentiable. For example, the variable-aperture stop 104 may have a special shape as shown in FIGS. 8A to 8D so that the secondary differentiation of g(t) takes positive and negative values.

Figure 9A:
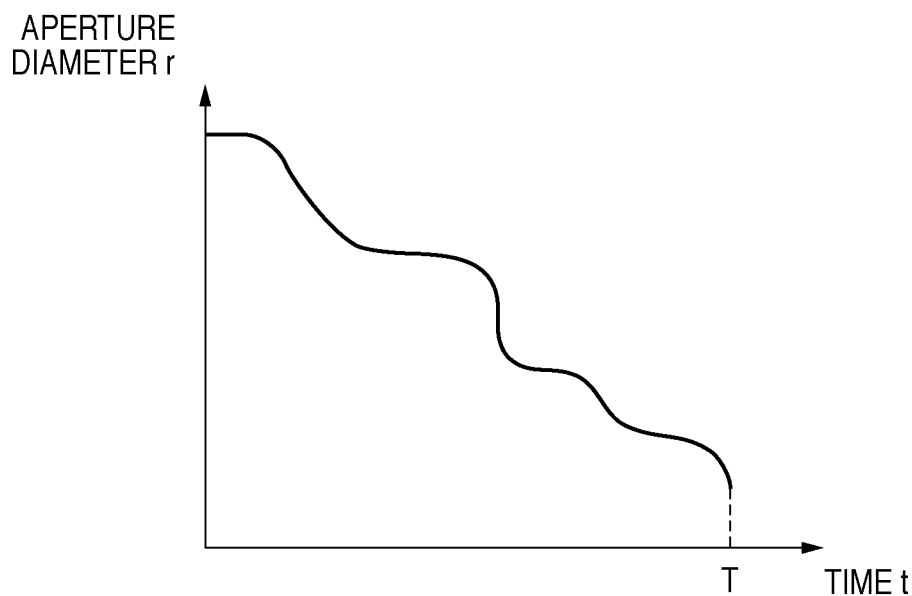
FIGS. 9A and 9B are graphs showing the characteristics of the relationship between the aperture diameter r and the time t elapsed from the start of exposure at a continuous change speed of the aperture diameter r according to the first embodiment.
Figure 9B:
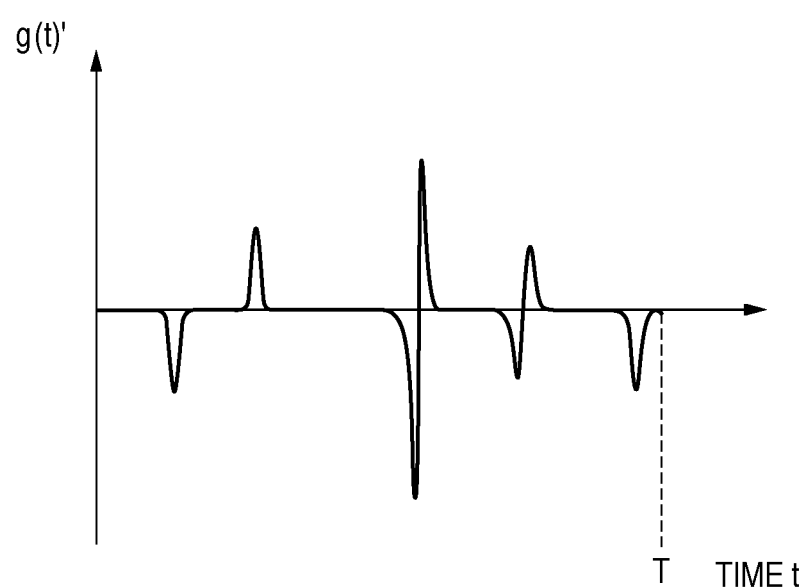

FIG. 9A shows the relationship g(t) between the aperture diameter r and the time t elapsed from the start of exposure when the secondary differentiation of a change of the aperture diameter r over the time t takes positive and negative values. FIG. 9B shows a time differentiation g(t)' of g(t). Also in this control, g(t) is defined to set Ka not to 0 but close to 0 and at the same time, set Km close to 0 with a small Δz. An existing waveform such as a damped sine wave is also available as long as g(t) meets these conditions. Further, the variable stop control unit 105 may control the change speed of the aperture diameter r while the shutter 106 controls exposure and cutoff of light.

Figure 10:
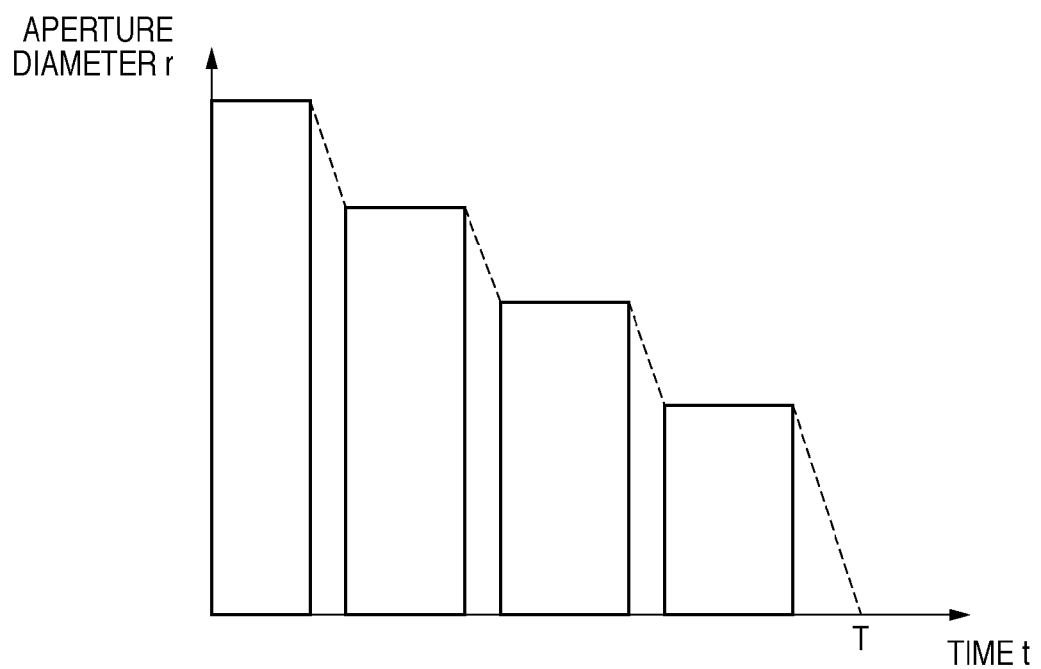
FIG. 10 is a graph showing the relationship between the aperture diameter and the time elapsed from the start of exposure when the shutter is used according to the first embodiment of the present invention.

FIG. 10 is a graph showing the relationship between the aperture diameter r and the time t elapsed from the start of exposure when the shutter 106 is used. The aperture diameter r when the shutter 106 cuts off light can be considered to be 0 regardless of the state of the variable-aperture stop 104. Also in this control, g(t) is determined to set Ka not to 0 but close to 0 and in addition, set Km close to 0 with a small Δz. At this time, every time the shutter 106 cuts off light, a plurality of sensed images ax may be acquired by the image acquiring unit 108 and composited to finally generate a sensed image a.

g(t) set in the above-described manner yields a blurred image which can be easily detected by the blur state detection unit 109.

When the shutter 106 is used, it needs to operate at high speed. It is therefore more desirable to use a liquid crystal shutter or an electronic shutter electronically attached to the image sensor unit 102.

The blur state detection unit 109 need not always be connected to the image sensing apparatus. For example, when detecting a blur state after shooting, a PC including the blur state detection unit 109 may be connected to the image sensing apparatus.

The first embodiment assumes that the blur function given by equation (2) has a uniform f($b_x$, $b_y$, z, r) regardless of the position and angle at which a light beam emitted by the point source passes through the imaging lens 103. In practice, f($b_x$, $b_y$, z, r) changes depending on the position and angle at which a light beam emitted by the point source passes through the imaging lens 103. For this reason, when solving the blur function, it is also possible to adopt f($b_x$, $b_y$, x, y, z, r) considering the pixel position (x, y) in the sensed image a, or divide the sensed image a into several regions and set different f($b_x$, $b_y$, z, r) for the respective regions.

Second Embodiment: Use of Switching Stop

Figure 11:
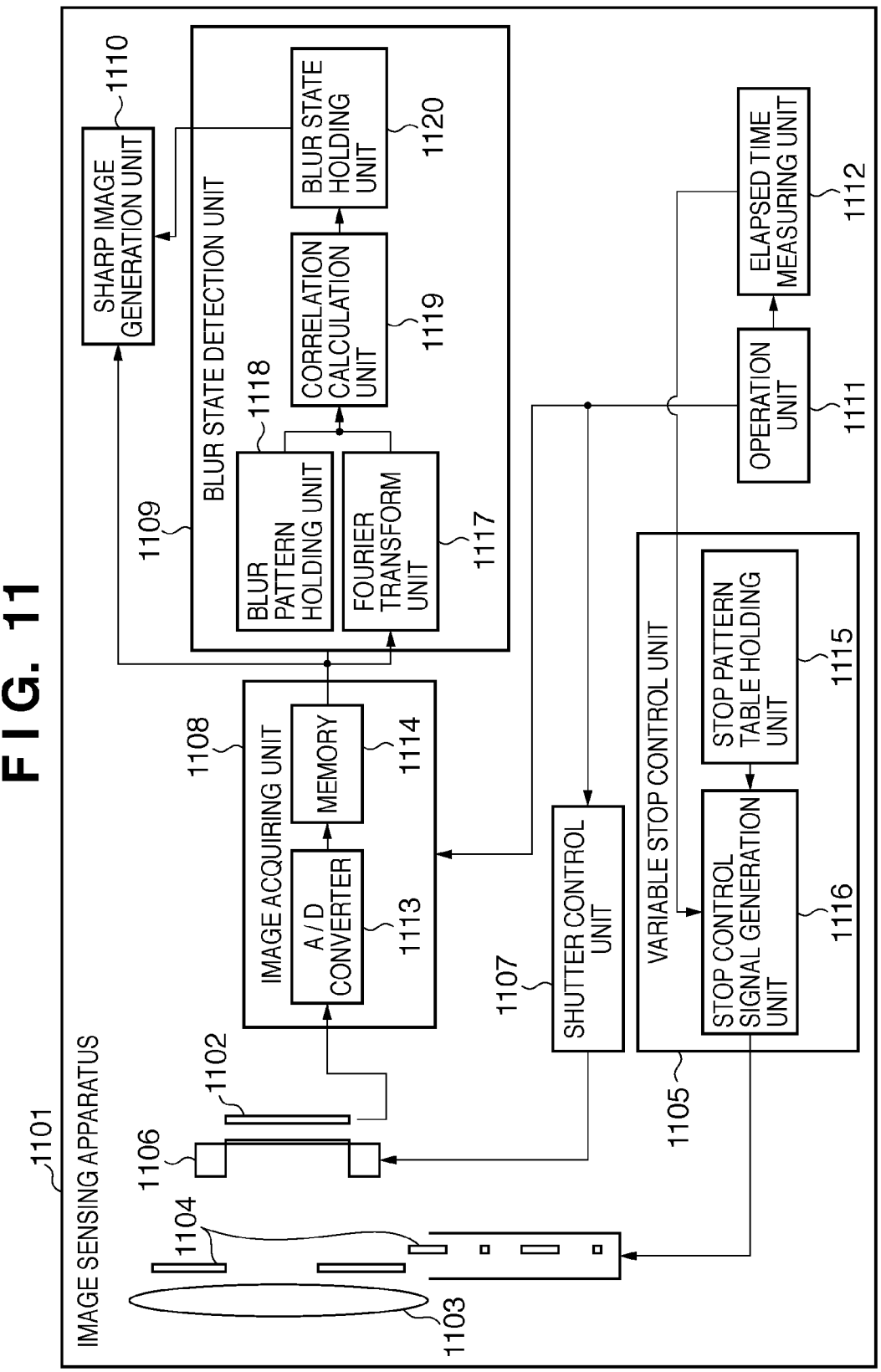
FIG. 11 is a block diagram exemplifying the arrangement of an image sensing apparatus according to the second embodiment.

FIG. 11 shows the arrangement of an image sensing apparatus 1101 according to the second embodiment of the present invention.

As shown in FIG. 11, the image sensing apparatus 1101 in the second embodiment includes an image sensor unit 1102, an imaging lens 1103, a switching stop 1104 serving as a variable stop, a variable stop control unit 1105, a shutter 1106, and a shutter control unit 1107. The image sensing apparatus 1101 also includes an image acquiring unit 1108, blur state detection unit 1109, sharp image generation unit 1110, operation unit 1111, and elapsed time measuring unit 1112.

The image sensor unit 1102 has the same structure as the image sensor unit 102 in the first embodiment. The imaging lens 1103 includes an optical system for projecting an object image on the image sensor unit 1102. The imaging lens 1103 in the embodiment uses a single convex lens. The switching stop 1104 (to be described later) is arranged at the aperture position to change the aperture shape. The imaging lens 1103 need not always use a single convex lens, and may be made up of a plurality of lenses or a combination with a reflecting mirror as long as an object image can be projected on the image sensor unit 1102 and the switching stop 1104 can be arranged.

The shutter 1106 and shutter control unit 1107 have the same structures as those of the shutter 106 and shutter control unit 107 in the first embodiment. Similar to the image acquiring unit 108 in the first embodiment, the image acquiring unit 1108 includes an A/D converter 1113 and memory 1114. The switching stop 1104 changes the aperture shape of the imaging lens 1103.

FIGS. 12A to 12C show the schematic structure of the switching stop 1104 in the second embodiment. As shown in FIG. 12A, the switching stop 1104 in the second embodiment includes an opening 1201, stop patterns 1202, a stop pattern storage 1203 which stores the stop patterns 1202, and a motor 1204 which drives the stop patterns 1202.

As shown FIGS. 12B and 12C, the switching stop 1104 with this arrangement in the second embodiment can change the aperture shape of the imaging lens 1103 by switching between a plurality of stop patterns 1202 under the control of the variable stop control unit 1105.

The variable stop control unit 1105 includes a stop pattern table holding unit 1115 and stop control signal generation unit 1116. The stop pattern table holding unit 1115 holds a table made up of a stop pattern number k of each stop pattern 1202 and the target value of an exposure time $t_k$ for each pattern number k. Stop pattern number 0 corresponds to the first shape, and stop pattern number 1 corresponds to the second shape.

Figure 13:
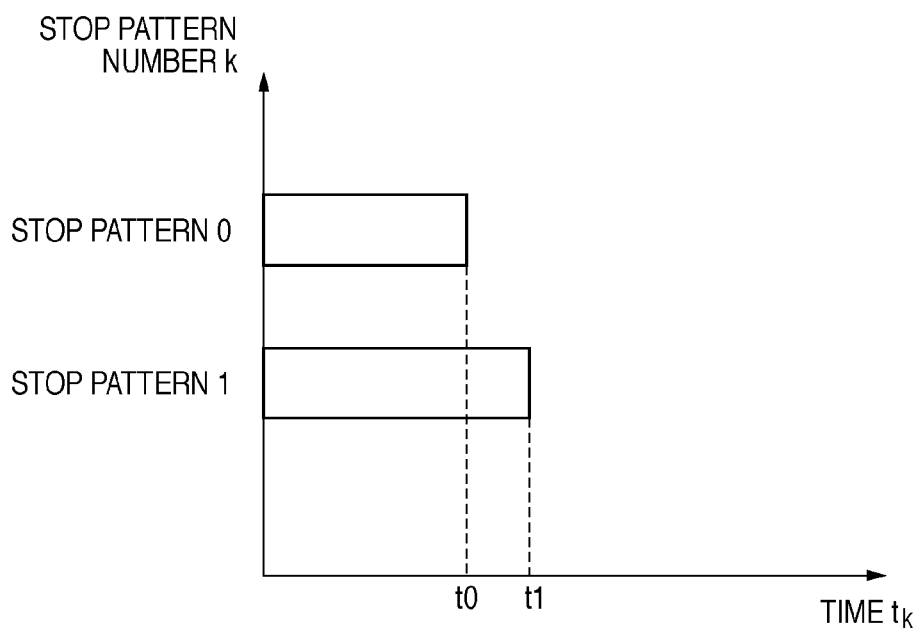
FIG. 13 is a graph showing the relationship between the stop pattern number and the exposure time that is held in a stop pattern table holding unit according to the second embodiment.

FIG. 13 shows the characteristic of the exposure time $t_k$ for the stop pattern number k that is held in the stop pattern table holding unit 1115. The relationship between the stop pattern number k and the exposure time $t_k$ in FIG. 13 can be given by $$t_k = v(k) \tag{10}$$

Figure 14A:
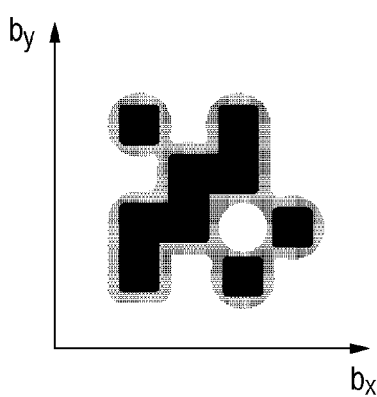
FIGS. 14A and 14B are graphs showing the characteristics of the relationship between the luminance and a position from the center of a blur in a blurred image of an object which is a point source present at a predetermined distance from an imaging lens when respective stop patterns are used according to the second embodiment.
Figure 14B:
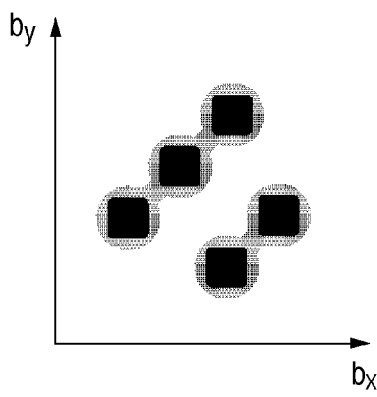

FIGS. 14A and 14B show characteristics between the luminance and a position ($b_x$, $b_y$) from the center of a blur in a blurred image of an object which is a point source present at a predetermined distance from the imaging lens 1103 when the respective stop patterns 1202 are used. FIG. 14A shows a characteristic in the use of stop pattern 0, and FIG. 14B shows a characteristic in the use of stop pattern 1. A dark portion in the characteristic exhibits a high-luminance region.

This characteristic changes depending on the stop pattern number k and the distance z between the imaging lens 1103 and the point source, as shown in FIGS. 14A and 14B. A luminance i at the position ($b_x$, $b_y$) from the center of a blur upon statically sensing an image with an arbitrary stop pattern at the distance z from the point source can be written as $$i = f_k(b_x, b_y, z) \quad (11)$$

Equation (11) assumes that light emitted by the point source has a uniform $f_k(b_x, b_y, z)$ regardless of the position and angle at which the light passes through the imaging lens 1103. A projected object image sensed by the image sensor unit 1102 is considered to be obtained by convoluting as many point sources as the pixels of the image sensor unit 1102 in the sensed image a(x, y) in accordance with equation (11). Based on equation (11), a luminance j at the distance z from the point source and the position ($b_x$, $b_y$) from the center of a blur in a blurred point source image generated after exposure can be defined as $$j(b_x, b_y, z) = \sum_{k=1}^{k_{max}} f_k(b_x, b_y, z) \cdot t_k \quad (12)$$

where $k_{max}$ is the maximum stop pattern number k for use. Equation (10) yields $$j(b_x, b_y, z) = \sum_{k=1}^{k_{max}} f_k(b_x, b_y, z) \cdot v(k) \quad (13)$$

J($\omega_x$, $\omega_y$, z) represents a 2D Fourier transform along the spatial axes $b_x$ and $b_y$ when the distance z between the imaging lens 1103 and the point source takes a predetermined value at j($b_x$, $b_y$, z). Letting H($\omega_x$, $\omega_y$) be a spatial frequency distribution, i.e., 2D Fourier transform in a general projected object image h(x, y), a correlation function Ka of J($\omega_x$, $\omega_y$) is given by equation (5) in the first embodiment.

Equation (5) assumes that the x-axis frequency component $\Omega_x$ takes a value ranging from $\omega_{xmin}$ to $\omega_{xmax}$ and the y-axis frequency component $\omega_y$ takes a value ranging from $\omega_{ymin}$ to $\omega_{ymax}$. An autocorrelation function Km upon a change of the distance z between the imaging lens 1103 and the point source by $\Delta z$ is given by equation (6) in the first embodiment.

In equation (6), j($b_x$, $b_y$, z) is determined to set Ka not to 0 but close to 0 within the possible range of the distance z between the imaging lens 1103 and the point source. This is equivalent to an operation capable of easily separating a sharp projected object image from a blurred image physically in the frequency domain. At the same time, j($b_x$, $b_y$, z) is defined to make Km close to 0 with a small $\Delta z$. This is equivalent to an operation of increasing the resolving power for detecting a change of the distance z between the imaging lens 1103 and the point source from a change of a blurred image.)

j($b_x$, $b_y$, z) which satisfies these relationships is obtained by multiplying, e.g., the blur function of the imaging lens 1103 by a 2D pseudo random pattern such as M array. In this case, the aperture shape of the imaging lens 1103 corresponds to the M array. The M array can meet the conditions of Ka and Km because not two, transparent and opaque values but multiple values including even a semitransparent value can be used to generate a larger number of patterns.

In the second embodiment, j($b_x$, $b_y$, z) needs to be generated from a combination of $f_k(b_x, b_y, z)$ and v(k). $f_k(b_x, b_y, z)$ is determined by the blur function of the imaging lens 1103 and the aperture shape of the stop pattern 1202 of the stop pattern number k. To generate many j($b_x$, $b_y$, z) using a single $f_k(b_x, b_y, z)$, the aperture shape of the stop pattern 1202 requires a semitransparent region.

However, it is physically difficult to create a semitransparent aperture shape with an accurate transmittance in all visible wavelength ranges. Hence, control finally equivalent to an aperture shape with a semitransparent region is executed based on v(k). For example, when f0=1 and f1=0 at a given ($b_x$, $b_y$, z), j($b_x$, $b_y$, z) having an arbitrary transmittance $\alpha$ at this ($b_x$, $b_y$, z) can be generated by setting for the exposure time T:

$$v(0) = T\alpha \quad (14)$$

$$v(1) = T(1-\alpha) \quad (15)$$

At this time, respective $f_k(b_x, b_y, z)$ are desirably not modified equations of an affine transform but affinely independent. This control is employed, too, to generate $f_k(b_x, b_y, z)$ and v(k) at random, and set a combination of $f_k(b_x, b_y, z)$ and v(k) which satisfy the conditions of Ka and Km.

In this fashion, v(k) to be held in the stop pattern table holding unit 1115 is defined, and the exposure time $t_k$ of each stop pattern 1202 of the switching stop 1104 is controlled based on v(k). The index for detecting a blur state can therefore be embedded in the sensed image a.

The stop control signal generation unit 1116 supplies a control signal to the switching stop 1104 to switch the stop pattern number k based on the stop pattern number k obtained from the elapsed time measuring unit 1112 and the target exposure time $t_k$ obtained from the stop pattern table holding unit 1115.

The blur state detection unit 1109 includes a Fourier transform unit 1117, blur pattern holding unit 1118, correlation calculation unit 1119, and blur state holding unit 1120.

The blur state detection unit 1109 in the second embodiment detects a blur state similarly to the blur state detection unit 109 in the first embodiment. The blur state holding unit 1120 holds, as blur states, distances $z_p$(x, y) and Jp($\omega_x$, $\omega_y$, z) at all the pixels of the sensed image a that are calculated by the correlation calculation unit 1119. The sharp image generation unit 1110 generates a blur-free sharp image $a_s$ from the sensed image a and the blur states held in the blur state holding unit 1120.

The sharp image generation unit 1110 in the second embodiment can generate a sharp image $a_s$(x, y) by performing the same processing as that of the sharp image generation unit 110 in the first embodiment. The operation unit 1111 has the same structure as that of the operation unit 111 in the first embodiment. The elapsed time measuring unit 1112 has the same structure as that of the elapsed time measuring unit 112 in the first embodiment.

Figure 15:
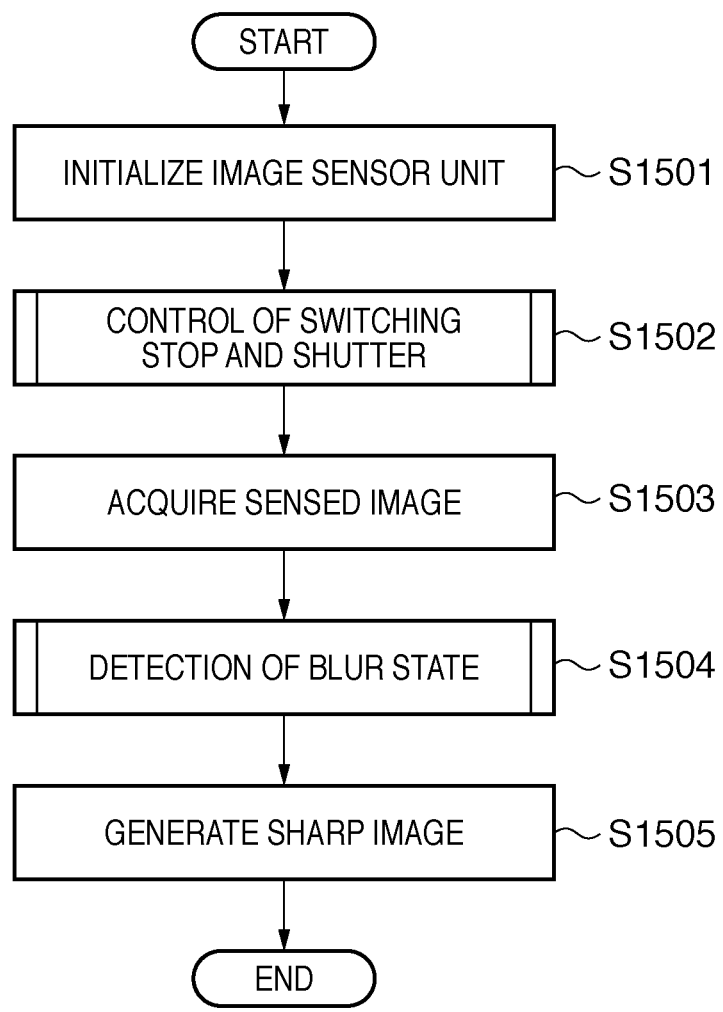
FIG. 15 is a flowchart for explaining the procedure of image sensing processing according to the second embodiment.

FIG. 15 is a flowchart for explaining the procedure of image sensing processing. The image sensing processing starts when the user presses the button of the operation unit 1111 to give an image sensing operation to the image sensing apparatus.

In step S1501, the image acquiring unit 1108 reads out and initializes all light detection states left in the image sensor unit 1102 in FIG. 11.

In step S1502, the variable stop control unit 1105 initializes the switching stop 1104 to stop pattern number 0 at the start of exposure. Upon completion of initializing the image sensor unit 1102 and switching stop 1104, the process advances to step S1503.

In step S1503, the switching stop 1104 and shutter 1106 are controlled to perform exposure. The control procedure of the switching stop 1104 and shutter 1106 in exposure will be described later. After the exposure, a sensed image is acquired. More specifically, the A/D converter 1113 in the image acquiring unit 1108 reads light of a projected object image sensed by the image sensor unit 1102 and converts it into digital data. The memory 1114 stores the digital data as a sensed image a.

The process advances to step S1504 to detect a blur state. More specifically, the blur state detection unit 1109 reads out the sensed image a from the memory 1114 to detect a blur state in the sensed image a. The procedure to detect a blur state by the blur state detection unit is the same as that in the first embodiment.

Finally in step S1505, the sharp image generation unit 1110 reads out the sensed image a from the memory 1114 in the image acquiring unit 1108. In addition, the sharp image generation unit 1110 reads out the blur states from the blur state holding unit 1120 in the blur state detection unit 1109. Then, the sharp image generation unit 1110 generates an unblurred sharp image $a_s$ from the readout sensed image a and blur states.

Figure 16:
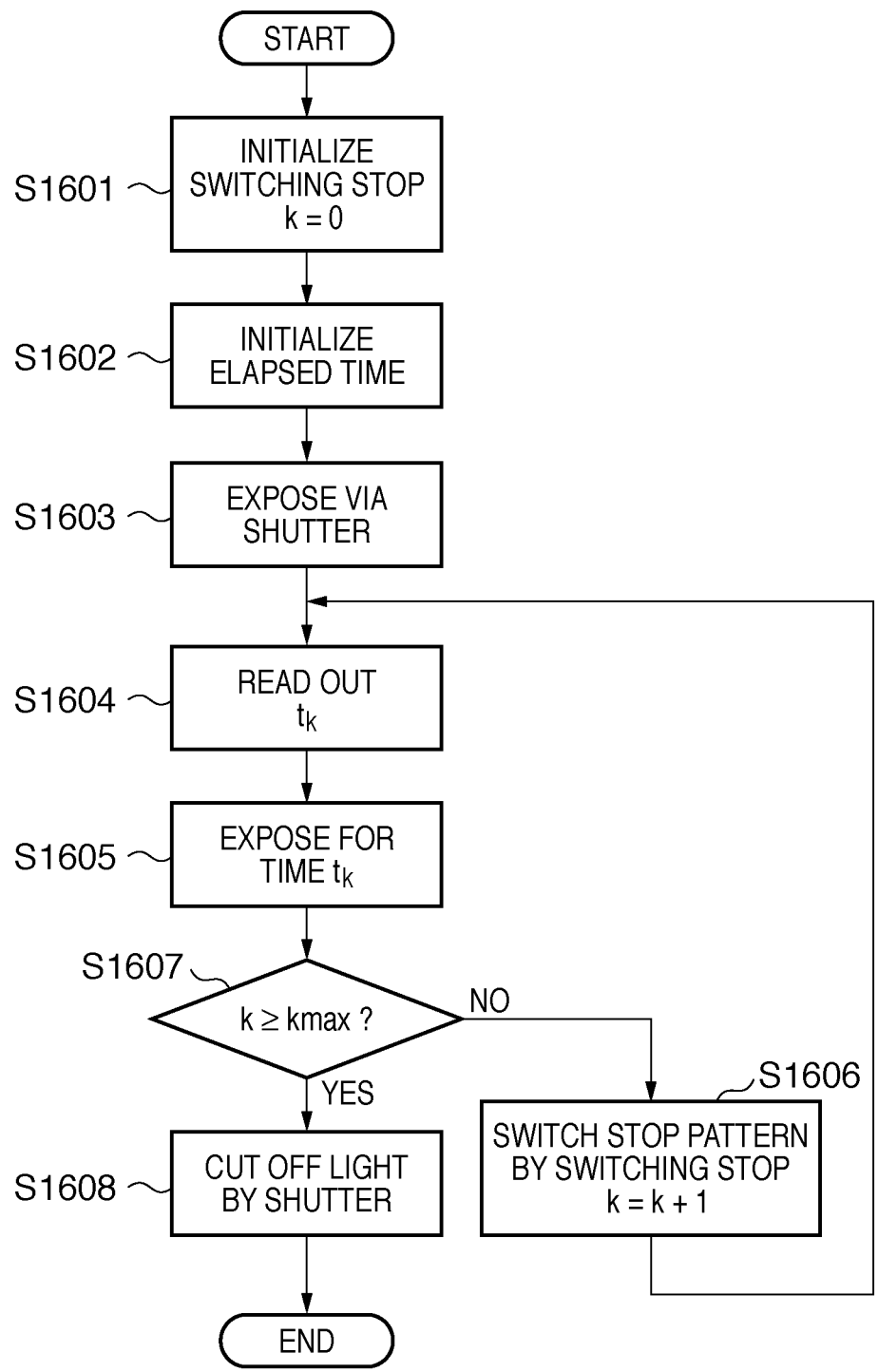
FIG. 16 is a flowchart for explaining the control procedure of the switching stop and shutter according to the second embodiment.

The control procedure of the switching stop 1104 and shutter 1106 will be described. FIG. 16 is a flowchart for explaining the control procedure of the switching stop 1104 and shutter 1106.

As shown in FIG. 16, the variable stop control unit 1105 controls the switching stop 1104 to set initial stop pattern 0 in exposure, and initializes it to the stop pattern number k=0 (step S1601).

The process advances to step S1602 to initialize the elapsed time measuring unit 1112 to set the time t elapsed from an image sensing operation=0, and start measuring an elapsed time. At the same time as initializing the elapsed time measuring unit 1112, the shutter 1106 is controlled to an exposure state (step S1603). Based on the stop pattern number k serving as an input, the exposure time $t_k$ for the stop pattern number of the switching stop 1104 is read out and acquired from the stop pattern table holding unit 1115 (step S1604).

In step S1605, exposure is done for the readout time $t_k$ while maintaining the state of the switching stop 1104. The elapsed time measuring unit 1112 measures the exposure time at this time. After the lapse of the time $t_k$, it is determined whether the stop pattern number k has reached the maximum number kmax (step S1607).

If it is determined that k≠kmax, the process advances to step S1606 to increment the stop pattern number k by one and switch the stop pattern to k by the switching stop 1104. The process then advances to step S1604 to repeat the above-described processing.

If it is determined in step S1607 that the stop pattern number k has reached kmax, the process advances to step S1608 to end the cycle and cut off light by the shutter 1106. After that, the process ends. This processing controls the switching stop 1104 and shutter 1106.

The second embodiment executes the foregoing processing to embed the index in a sensed image to detect a blur state, and detect an embedded blur state. The switching stop 1104 enables exposure equivalent to that by a stop having a semitransparent region of an accurate transmittance. The embodiment can greatly improve the performance to embed a blur state, compared to a conventional technique using a fixed stop. The embodiment allows manufacturing a stop with a semitransparent region of an accurate transmittance, which serves as a high-performance index.

The switching stop 1104 in FIG. 12A uses the plate-like stop pattern 1202 having a physical opening. However, a liquid crystal electronic stop or the like is desirable when using many stop patterns of aperture shapes with more detailed transmittances.

FIGS. 17A to 17C exemplify a liquid crystal stop which forms an aperture shape by a liquid crystal. In this example, a liquid crystal panel 1701 is arranged at the opening. A liquid crystal driving circuit unit 1702 for receiving a control signal from the variable stop control unit 1105 generates an arbitrary stop pattern, like stop patterns 1 and 2 as shown in FIGS. 17B and 17C respectively. The electronic stop can control to adaptively change the stop pattern in accordance with, e.g., the spatial frequency of a projected object image.

When the switching stop 1104 in FIG. 12A switches the stop pattern, the aperture shape becomes indefinite during switching, so the switching period is desirably as short as possible. Alternatively, the shutter 1106 may be controlled to cut off light during switching.

The variable stop control unit 105, blur state detection unit 109, and sharp image generation unit 110 can be implemented by operating a program stored in the RAM or ROM of a computer or the like. The present invention includes the program and a computer-readable recording medium recording the program.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-201053 filed Aug. 4, 2008, which is hereby incorporated by reference herein in its entirety.

The invention claimed is:

1. An image processing apparatus comprising:
    an image acquisition unit configured to acquire, as an image, on an image sensor unit, light traveling from an object via an opening of a stop;
    a control unit configured to control a shape of the opening based on a function which defines a temporal change of the shape of the opening when said image acquisition unit acquires the image;
    a decision unit configured to utilize the function to decide a distance to the object captured in the image, based on a blur state of the object in the image; and
    a holding unit configured to hold a blur pattern derived from the function,
    wherein the decision unit is configured to decide a distance to the object based on a correlation between the blur state of the object in the image and the blur pattern.

2. The apparatus according to claim 1, wherein the function defines a temporal change of an aperture diameter of the opening, and
    wherein while said image acquisition unit acquires the image, a secondary differentiation of the function takes positive and negative values.

3. The apparatus according to claim 1, wherein the function defines a change of the shape of the opening except for a change expressed by an affine transform.

4. The apparatus according to claim 1, wherein the function is nondifferentiable at least one point.

5. The apparatus according to claim 1, wherein said control unit controls the shape of the opening to change from a first shape of the opening at a timing of starting acquiring the image by said image acquisition unit to a second shape of the opening at a timing of ending acquiring the image by said image acquisition unit.

6. The apparatus according to claim 1, wherein the function is defined by a lookup table.

7. The apparatus according to claim 1, further comprising a shutter control unit configured to control a shutter to expose or shield said image sensor unit to or from light by transmitting or cutting off light traveling from the object in cooperation with control by said control unit when said image acquisition unit acquires the image.

8. An image processing method using a computer to perform a method comprising the steps of:
   an acquisition step of acquiring, as an image, on an image sensor unit, light traveling from an object via an opening of a stop;
   a control step of controlling a shape of the opening based on a function which defines a temporal change of the shape of the opening when acquiring the image; and
   a decision step of utilizing the function to decide a distance to the object captured in the image, based on a blur state of the object in the image,
   wherein the decision step decides a distance to the object based on a correlation between the blur state of the object in the image and a blur pattern, the blur pattern being derived from the function and held in a holding unit.

9. The method according to claim 8, wherein the function defines a temporal change of an aperture diameter of the opening, and
   wherein while the image is acquired, a secondary differentiation of the function takes positive and negative values.

10. The method according to claim 8, wherein the function defines a change of the shape of the opening except for a change expressed by an affine transform.

11. The method according to claim 8, wherein the function is nondifferentiable at least one point.

12. The method according to claim 8, wherein in the control step, the shape of the opening is controlled to change from a first shape of the opening at a timing of starting acquiring the image to a second shape of the opening at a timing of ending acquiring the image.

13. The method according to claim 8, wherein the function which defines the temporal change of the shape of the opening is defined by a lookup table.

14. The method according to claim 8, further comprising controlling a shutter to expose or shield the image sensor unit to or from light by transmitting or cutting off light traveling from the object in cooperation with control in the control step when the image is acquired.

15. The apparatus according to claim 1, wherein said decision unit scans the image to decide the distance to the object.

16. The apparatus according to claim 1, wherein said decision unit analyzes a frequency of the image to decide the distance to the object.

17. The apparatus according to claim 1, wherein said decision unit compares the image with each of plural blur patterns to decide the distance to the object.

18. The apparatus according to claim 1, wherein said decision unit calculates a correlation function between the image and each of plural blur patterns to decide the distance to the object.

19. The method according to claim 8, wherein said decision step scans the image to decide the distance to the object.

20. The method according to claim 8, wherein said decision step analyzes a frequency of the image to decide the distance to the object.

21. The method according to claim 8, wherein said decision step compares the image with each of plural blur patterns to decide the distance to the object.

22. The method according to claim 8, wherein said decision step calculates a correlation function between the image and each of plural blur patterns to decide the distance to the object.

* * * * *